(12) United States Patent
Erlich et al.

(10) Patent No.: US 7,551,591 B2
(45) Date of Patent: Jun. 23, 2009

(54) METHOD FOR DATA TRANSMISSION WITHIN A WIRELESS LOCAL AREA NETWORK

(75) Inventors: Yossi Erlich, Hod Hasharon (IL); Yaron Rashi, Ra'anana (IL)

(73) Assignee: Infineon Technologies AG, Munich (DE)

(*) Notice: Subject to any disclaimer, the term of this patent is extended or adjusted under 35 U.S.C. 154(b) by 435 days.

(21) Appl. No.: 10/477,388

(22) PCT Filed: Sep. 11, 2003

(86) PCT No.: PCT/EP03/10122
§ 371 (c)(1),
(2), (4) Date: Jul. 28, 2005

(87) PCT Pub. No.: WO2005/025135
PCT Pub. Date: Mar. 17, 2005

(65) Prior Publication Data
US 2006/0045053 A1      Mar. 2, 2006

Related U.S. Application Data

(63) Continuation-in-part of application No. PCT/EP03/10122, filed on Sep. 11, 2003.

(51) Int. Cl.
*H04Q 7/24* (2006.01)

(52) U.S. Cl. .......... 370/338; 370/331; 370/328; 370/350; 455/411; 455/524; 455/456.1

(58) Field of Classification Search .......... 370/331, 370/338, 328, 350; 375/365; 455/456.1, 455/411, 524, 444
See application file for complete search history.

(56) References Cited

U.S. PATENT DOCUMENTS 5,513,210 A   4/1996   Vook et al.
5,822,361 A   10/1998  Nakamura et al.
2002/0044549 A1   4/2002   Johansson et al.
2003/0081695 A1*  5/2003   Eilts et al. .......... 375/316
2004/0005022 A1*  1/2004   Zhu et al. .......... 375/365
2005/0047371 A1*  3/2005   Bennett .......... 370/331

FOREIGN PATENT DOCUMENTS

EP   0 709 983 A1   5/1996
EP   1 107 522 A1   6/2001
GB   2 371 449 A    7/2002
WO   WO 01/86859 A2   11/2001
WO   WO 01/86859 A3   11/2001
WO   WO 02/05492 A1   1/2002

* cited by examiner

*Primary Examiner*—Vincent P. Harper
*Assistant Examiner*—Fred A Casca
(74) *Attorney, Agent, or Firm*—Maginot, Moore & Beck

(57) ABSTRACT

Method for data transmission within a wireless local area network (WLAN) which is operable simultaneously with other wireless local area networks (WLANs) in the same local area, wherein each wireless local area network (WLAN) comprises at least one transceiver, wherein a transmitting transceiver of a wireless local area network (WLAN) transmits a signal that conveys data to a receiving transceiver of the same wireless local area network (WLAN) during data transmission intervals with changing frequency bands, wherein the frequency band is changed with each data transmission interval in a cyclical order according to a predetermined frequency hopping sequence which is identical for all simultaneously operated wireless local area networks (WLANs), wherein the transmitting transceivers of different wireless local area networks (WLANs) start the respective data transmissions at shifted times to establish different data transmission channels for the wireless local area networks (WLANs).

6 Claims, 16 Drawing Sheets

FIG 1 State of the art
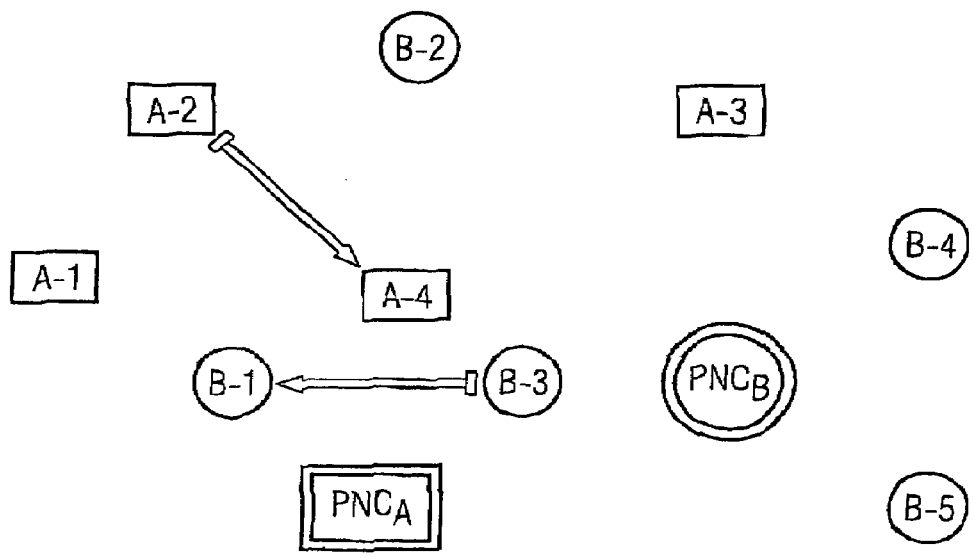
FIG 2 State of the art
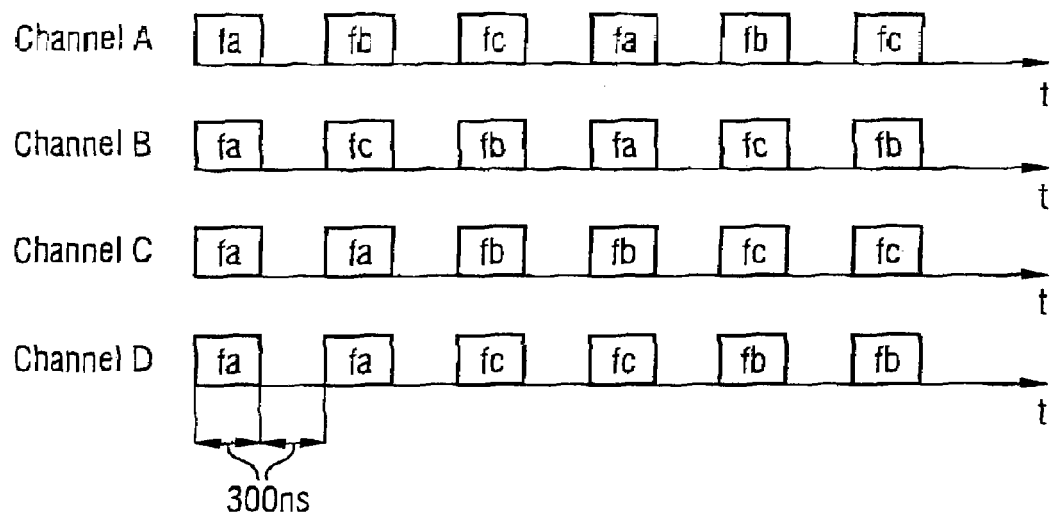

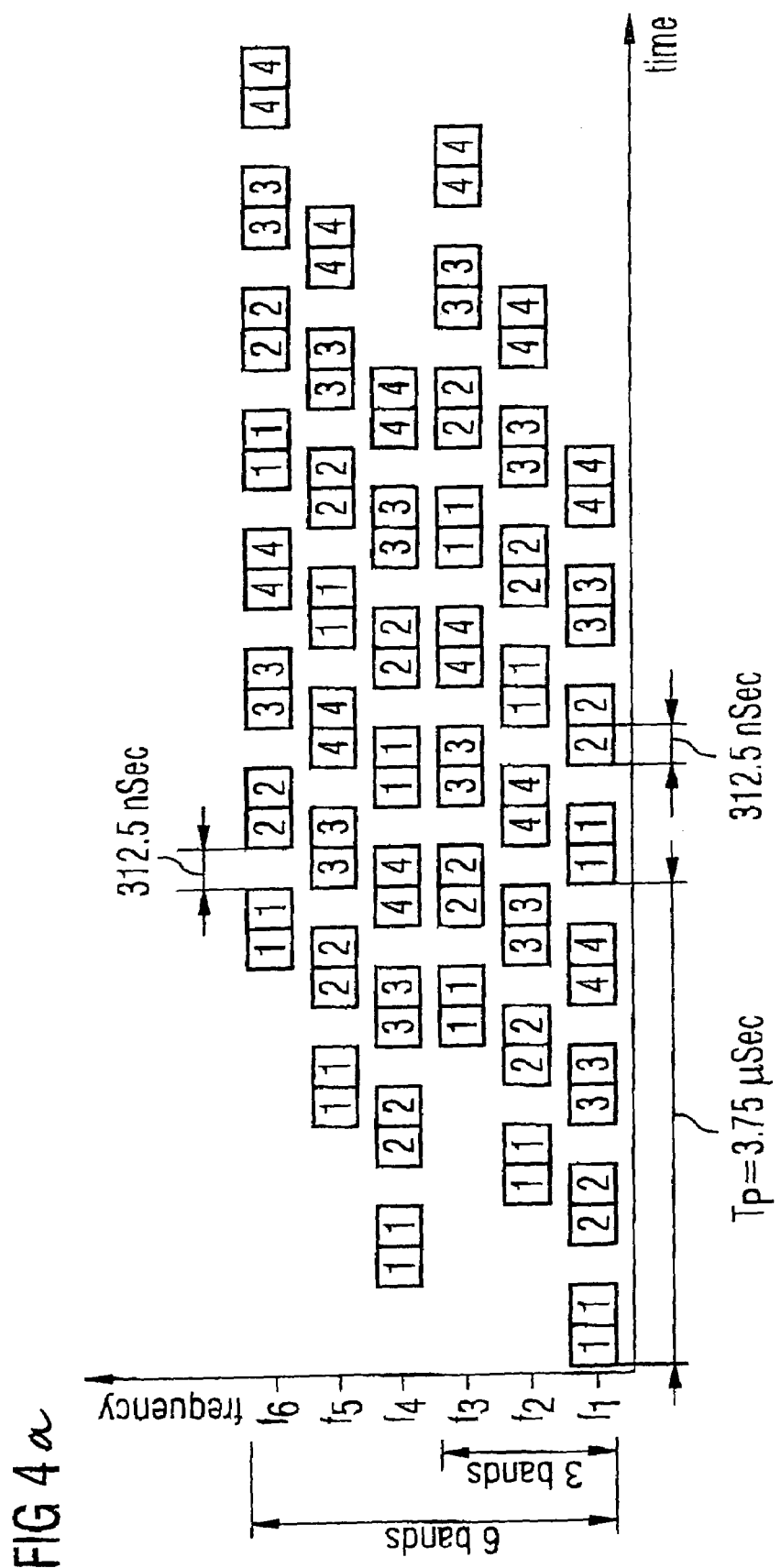

METHOD FOR DATA TRANSMISSION WITHIN A WIRELESS LOCAL AREA NETWORK

This application is a continuation-in-part of co-pending International Patent Application No. PCT/EP03/10122, filed on Sep. 11, 2003 designating the United States of America and claims priority to that application for all matters disclosed therein.

The present invention relates generally to a wireless local area network (WLAN) which is operated simultaneously with other wireless local area networks (WLANs) in the same local area.

Wireless local areas networks (WLAN) represent a new form of communications among personal computers or other devices that wish to deliver digital data. A wireless network is one that does not rely on cable as the communications medium. Whether twisted pair, coax, or optical fibers, hard wiring for data communication systems within a building environment is expensive and troublesome to install, maintain and to change. To avoid these disadvantages wireless networks transmit data over the air using signals that cover a broad frequency range from few MHz to a few terahertz. Depending on the frequency involved wireless networks comprise radio wireless networks, microwave wireless networks and infrared wireless networks.

Wireless networks are used mainly for connecting devices within a building or connecting portable or mobile devices to a network. Further applications are keeping mobile devices in contact with a data base and ad hoc networks for example in committee or business meetings.

Wireless local area networks (WLAN) and wireless personal area networks (WPAN) are used to convey information over relatively short ranges. The A wireless personal area network (WPAN) is defined in the IEEE 802.15.3 standard.

In many situations and scenarios several wireless local area networks (WLANs) are operated simultaneously with each other in the same local area. A typical situation would be a big office wherein many office cubicles are located belonging to different divisions of the same company, e.g. search division, accounting division, marketing division. The computers of each division are connected in such a situation by means of seperate wireless local area networks (WLANs). A wireless local area network (WLAN) comprising several transceivers is referred to as a Piconet.

FIG. 1 shows typical scenario where two wireless local area networks (WLANs) are operated in the same local area. In the example shown in FIG. 1 the first Piconet $WLAN_A$ comprises a Piconet Coordinator (PNC) for the wireless local area network $WLAN_A$ and some additional transceivers A1, A2, A3, A4. The second Piconet $WLAN_B$ comprises a Piconet Coordinator ($PNC_B$) and further transceivers B1, B2, B3, B4, B5. The transceivers including the Piconet Coordinators can either have a fixed location or can be moveable devices. The Piconet Coordinators ($PNC_A$, $PNC_B$) are coordinating transceivers which are provided for managing the data traffic within respective wireless local area network ($WLAN_A$, $WLAN_B$).

In the shown example a first transmitting transceiver A2 transmits data to a receiving transceiver A4 of the first wireless local area network $WLAN_A$ on the data transmission channel of the wireless local area network $WLAN_A$. Further a transmitting transceiver B3 of the second wireless local area network $WLAN_B$ transmits data to a receiving transceiver B1 of the same wireless local network $WLAN_B$ on the data transmission channel of this wireless local area network. The data exchange between transceivers is performed half duplex, i.e. a transceiver can either send or receive data over a data link to another transceiver of the same wireless local area network. The data are exchanged via data packages.

Each Piconet $WLAN_i$ has its respective data transmission channel, i.e. the data transmission channel is used by all transceivers of the corresponding Piconet $WLAN_i$.

In most cases the frequency resources available for a wireless local area network WLAN are bounded by regulations. Usually a certain frequency band is allocated for the wireless local networks. Within this frequency band each transceiver is required to radiate no more than a specified average power spectral density (PSD).

To operate several wireless local area networks simultaneously several proposals have been made.

In frequency division multiplexing (FDM) systems according to the state of the art the allocated frequency band is divided into several sub-frequency bands. In FDM-system each data transmission channel and consequently each Piconet is using a different frequency sub-band. Thus, data transmission in different Piconets (WLANs) can simultaneously be performed without interference.

The disadvantage of FDM-systems is that the available capacity for each Piconet is reduced compared to the case where any Piconet is allowed to use the entire allocated frequency band.

The channel capacity is given by the following formula:

$$cap = \int \log\left(1 + \frac{PSD(f)}{N(f)}\right) df$$

The capacity of each Piconet is larger if it will be allowed to use the full frequency band instead of just the allocated frequency sub-band. The reduction in the capacity in FDM-systems translates directly to throughput reduction. Consequently the achievable data bit rate for any specific transmitter-receiver distance is reduced in FDM-systems.

In a CDMA-DSSS (Code Division Multiple Access-Direct Sequence Spread Spectrum) system according to the state of the art a direct sequence spread spectrum is used as a modulation scheme. In DSSS a sequence of many short data symbols is transmitted for each information symbol. In order to support several data transmission channels or Piconets different data sequences with low cross correlation between them are used for different data transmission channels.

In a CDMA-DSSS-system each channel can use the entire frequency band until the maximum possible throughput can be achieved. If some Piconets are working in the same area then the transmission of one Piconet is seen as additional noise by the other Piconets.

The disadvantage of the CDMA-DSSS-System is that there exists a so called near-far problem. When a transceiver in one Piconet is transmitting this transmission will be seen as additional noise by other Piconets. The level of the additional noise is proportional to the cross correlation between the spreading sequences and the received power level of the interferer's signal. For example if the interfering transceiver of Piconet A is close to a receiving transceiver of Piconet B, i.e. closer than a transmitting receiver of Piconet B then the added noise level that the receiving transceiver of Piconet B sees causes a significant reduction in the achievable bit rate for the receiver, so that even a complete blocking of the data transmission channel can occur.

A further proposal according to the state of the art to operate several wireless local area networks (WLANs) simultaneously is to use a CDMA-FH(Code Division Multiple Access-Frequency Hopping)-System. In this CDMA-FH-System the original frequency band is divided into several sub-frequency bands. Any transmitting transceiver uses a certain frequency sub-frequency band for a certain time interval and moves then to the next frequency band. A predefined frequency hopping sequence controls the order of sub-frequency bands such that both the transmitting and receiving transceiver has the information when to switch to the next frequency and to what sub-frequency band.

In a conventional CDMA-FH-system the different data transmission channels are assigned with different frequency hopping sequences.

FIG. 2 shows a CDMA-FH-System according to the state of the art with four data transmission channels A CDMA-FH-System with four data transmission channels can operate four Piconets or wireless local area networks (WLANs) simultaneously at the same local area. In the shown example any transceiver uses a certain frequency band for a transmission interval for 300 ns, remains idle for a predetermined guard time of 300 ns and uses the next frequency band within the next transmission interval etc.

The frequency hopping sequence is fixed for any data transmission channel A, B, C, D. In the given example data transmission channel A has the frequency hopping sequence abc, channel B has the frequency hopping sequence acb, channel C has the frequency hopping sequence aabbcc and channel D has the frequency hopping sequence aaccbb.

As can be seen from FIG. 2 for any two data transmission channels there are less than four (either two or three) collisions for six subsequent transmission intervals. This is also true for any arbitrary time shift of any transmitter.

A collision is a situation when two transceivers use the same frequency band at the same time. For example a collision between data transmission channel A and data transmission channel B occurs during the first transmission interval when both channels A, B use frequency fa and during the fourth transmission interval when both channels A, B use again frequency fa. A further collision is for example between channel B and channel D during the first transmission interval when both channels B, D use frequency a and the sixth transmission interval when both channels B, D use frequency fb.

A CDMA-FH-System according to the state of the art as shown in FIG. 2 is better than a FDM-System in cases when the average power spectral density (PSD) is the dominant constraint. In FDM-Systems the transmitted power is proportionally to the used band width. In frequency hopping systems any transceiver can transmit the maximum allowed power. This is true because for any frequency sub-band the transceiver is allowed to increase the power spectral density (PSD) proportionally to the duty cycle ratio. In the example shown in FIG. 2 the PSD at any frequency sub-band during the transmission interval that uses this frequency sub-band is six times higher than the average because of the ⅙ duty cycle. The fact that the transceiver is allowed to use the maximum possible transmitting power improves the achievable data rate per distance.

The disadvantage of a conventional CDMA-FH-System is that collisions can occur. When two Piconets are operating at the same local area there is a high probability for collisions.

In the example shown in FIG. 2 collisions occur in one third (or half for some pairs) of the transmission intervals. This situation gets even worse when more than two Piconets are working. For four Piconets or data transmission channels A, B, C, D there is even a chance that all three bands are blocked and communication becomes impossible within the wireless local area networks.

Accordingly it is the object of the present invention to provide a method for data transmission within a wireless local area network (WLAN) which allows to operate the wireless local area network simultaneously with other wireless local area networks (WLANs) in the same local area and which prevents collisions.

This object is achieved by a method having the features of main claim 1.

The invention provides a method for data transmission within a wireless local area network (WLAN) which is operated simultaneously with other wireless local area networks (WLANs) in the same local area, wherein each wireless local area network (WLAN) comprises several transceivers, wherein a transmitting transceiver of a wireless local area network (WLAN) transmits data to a receiving transceiver of the same wireless local area network (WLAN) during data transmission intervals with changing frequency bands, wherein the frequency band is changed with each data transmission interval in a cyclical order according to a predetermined frequency hopping sequence which is identical for all simultaneously operated wireless local area networks (WLANs), wherein the transmitting transceivers that use different channels and belong to different wireless local area networks, (WLANs), use different time shifts for the frequency hopping cycle, with reference to a local time point that each transceiver holds.

An advantage of the present invention is that the efficiency of frequency usage by the wireless local area networks (WLANs) in improved, i.e. more data transmission channels and more Piconets are allowed to operate simultaneously without significantly reducing the available data throughput in each Piconet.

In embodiment of the method according to the present invention each wireless local area network (WLAN) comprises a coordinating transceiver (PNC) for managing the data traffic within the wireless local area network (WLAN).

In a preferred embodiment the transceivers open a synchronization time window, periodically every predetermined time period (Tsync), for a predetermined time length (Twin).

In a preferred embodiment the start time of the synchronization window is defined as the local reference time for alignment of frequency hopping sequence.

In a first embodiment each transceiver transmit or receive a predetermined synchronization signal during the first synchronization time window according to a synchronization policy sequence.

In a second preferred embodiment each transceiver transmits and receives a predetermined synchronization signal during the synchronization time window according to second synchronization policy sequence at the same time.

In a further preferred embodiment a predetermined synchronization policy sequence is provided for each data transmission channel.

In a further preferred embodiment any new transceiver, that has not decided yet what channel to use, will use a different policy sequence from the sequences allocated to specific channels.

In a further preferred embodiment the synchronizing signal is transmitted within the synchronization time window, at a fixed point in reference to the beginning of the synchronization window, during synchronization transmission intervals with changing frequency bands.

In a preferred embodiment a frequency band is changed with each synchronization transmission interval in a predetermined cyclical order according to a synchronization frequency hopping sequence.

The order of frequency bands of the synchronization frequency hopping sequence is the same or reversed (or any other selection) to the order of frequency bands of the frequency hopping sequence for the data transmission.

In one embodiment of the method according to the present invention the coordinating transceiver (PNC) of a wireless local area network (WLAN) receives synchronization signals during uplink synchronization time windows depending on the synchronization policy sequence provided for the respective data transmission channel of the wireless local area network (WLAN) and the other transceivers of the wireless local area network (WLAN) receive a synchronization signal during downlink synchronization time windows according to the synchronization policy sequence provided for the respective data transmission channel of the wireless local area network (WLAN).

In a still further preferred embodiment of the method according to the present invention a transceiver receiving a signal during a synchronization time window detects the arrival time of the synchronization signal.

In a preferred embodiment the transceiver receiving a signal during the synchronization time window correlates the received signal with an expected synchronization signal to generate a correlation signal.

In a preferred embodiment the transceiver detects the time of the first signal peak of the generated correlation signal as the arrival time of the synchronization signal and compares the detected arrival time with an expected time of reception for a synchronization signal sent by said transceiver.

In a preferred embodiment the transceiver aligns its synchronization period to match the detected arrival time of the synchronization signal if the arrival time is earlier than the expected time of reception.

In a preferred embodiment the autocorrelation function of the synchronization signal within a synchronization transmission interval approximates an impulse function.

In a preferred embodiment the data transmission intervals have a predetermined time length.

In a further embodiment the time difference between the data transmission channel of different wireless local area networks (WLANs) is the sum of the time length of a transmission interval and a predetermined guard time.

In a preferred embodiment any two transceivers, belonging or not belonging to the same Piconet, are directly synchronized if the synchronization signal transmitted from one transceiver is received inside the synchronization window of the other transceiver.

In a preferred embodiment a group of transceivers are all synchronized and form a cluster if any two transceivers in the group can be connected via a virtual chain of directly synchronized transceivers.

In a preferred embodiment the average synchronization period of any device in a cluster will be equal to the period of the fastest device in the cluster (the device with the shortest inherent period).

In a preferred embodiment any Piconet coordinator (PNC) increases the synchronization frequency at random times, for a predetermined acceleration period, thus increasing the average synchronization frequency of all transceivers in his cluster, to enable merging of that cluster with other clusters.

In a preferred embodiment a first possible process to generate random acceleration times is for the PNC to identify acceleration periods, generated by himself or other PNCs, and at the end of any of these periods to start a timer that will count from zero to a random time, selected according to the following cumulative distribution function (CDF):

$$CDF(t) = \begin{cases} 0 & \text{if } t \leq s \\ \frac{q^t - q^s}{q^e - q^s} & \text{if } s \leq t \leq e \\ 1 & \text{if } t > e \end{cases}$$

In a preferred embodiment, when using the first alternative to generate the random acceleration periods, any PNC will increase the synchronization frequency when the timer reaches the selected random time.

In a preferred embodiment of the method according to the present invention, when using the first alternative to generate random acceleration periods, and when a coordinating transceiver (PNC) of a wireless local area network (WLAN) within a cluster detects that the synchronization frequency has already been increased by another coordinating transceiver (PNC) of another wireless local area network (WLAN) within the same cluster it resets its timer and waits for the end of the acceleration period.

In a preferred embodiment a second possible process to generate random acceleration times is for the PNC to use one of two modes: acceleration initiator or non acceleration initiator.

In a preferred embodiment, when using the second alternative to generate the random acceleration periods, any PNC that is in acceleration initiator mode will start a timer immediately after he finishes an acceleration period. The timer will count from zero to a random time, selected according to some distribution function that will generate a number between TAccMin and TaccMax. When the timer reaches the selected random time the PNC will start a new acceleration period.

In a preferred embodiment, when using the second alternative to generate the random acceleration periods, any PNC that is in acceleration initiator mode and identifies acceleration period generated by another PNC, will switch to non initiator acceleration mode.

In a preferred embodiment, when using the second alternative to generate the random acceleration periods, any PNC that is in non acceleration initiator mode will identify acceleration periods and will start a counter after each such period. When the counter reaches TaccSwitch (which is higher than TaccMax) the PNC will generate an acceleration period and switch to the acceleration initiator mode.

In a preferred embodiment the method according to the present invention when a first cluster having a first synchronization frequency and a second cluster having a second synchronization frequency approach each other they merge to form a united cluster when a synchronization frequency of the first or second cluster has been increased for the predetermined acceleration period so that at least one synchronization time window of the periodic synchronizing time windows of the first and the second clusters overlap each other.

In the following preferred embodiments the method for data transmission within a wireless local area network (WLAN) are described with reference to the enclosed drawings.

FIG. 1 shows a configuration of two wireless local area networks (WLANs) which are operated simultaneously according to the state of the art;

FIG. 2 shows a timing diagram of a CDMA-FH data transmission system with four data transmission channels according to the state of the art;

FIGS. 4a, 4b show a timing diagrams of a data transmission within a wireless local area network (WLAN) using a second embodiment and third embodiment of the data transmission method according to the present invention;

Figure 5A:
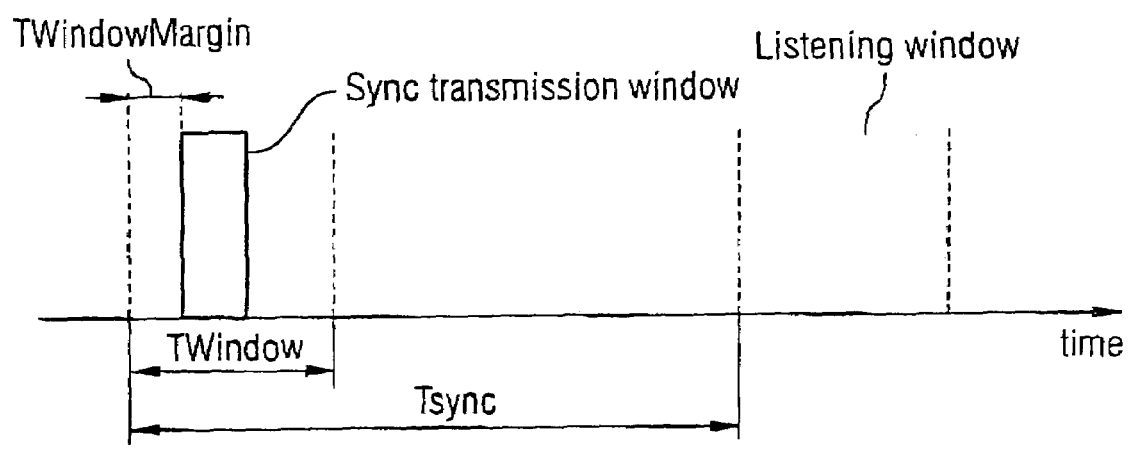
Figure 6A:
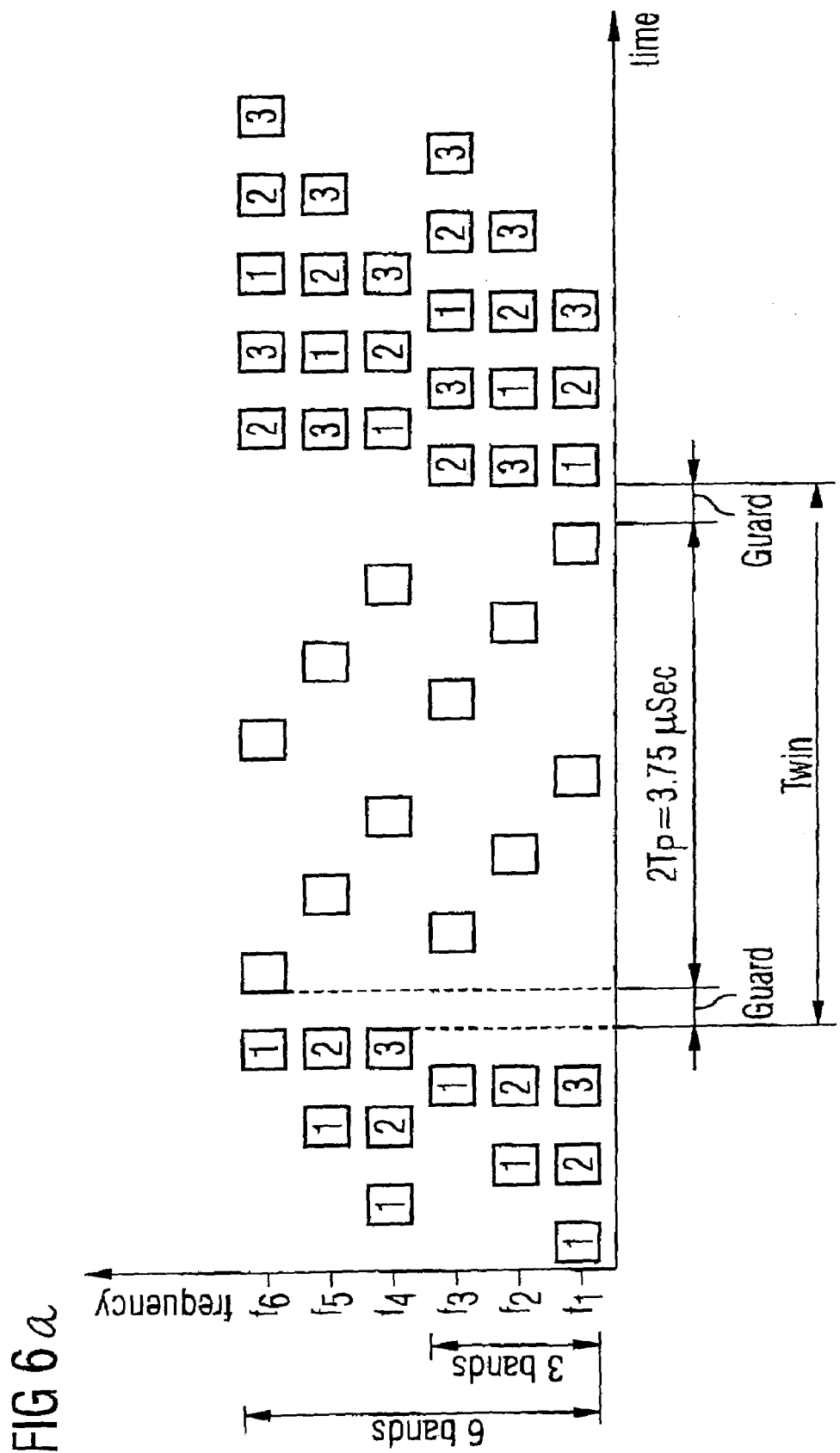
Figure 6G:
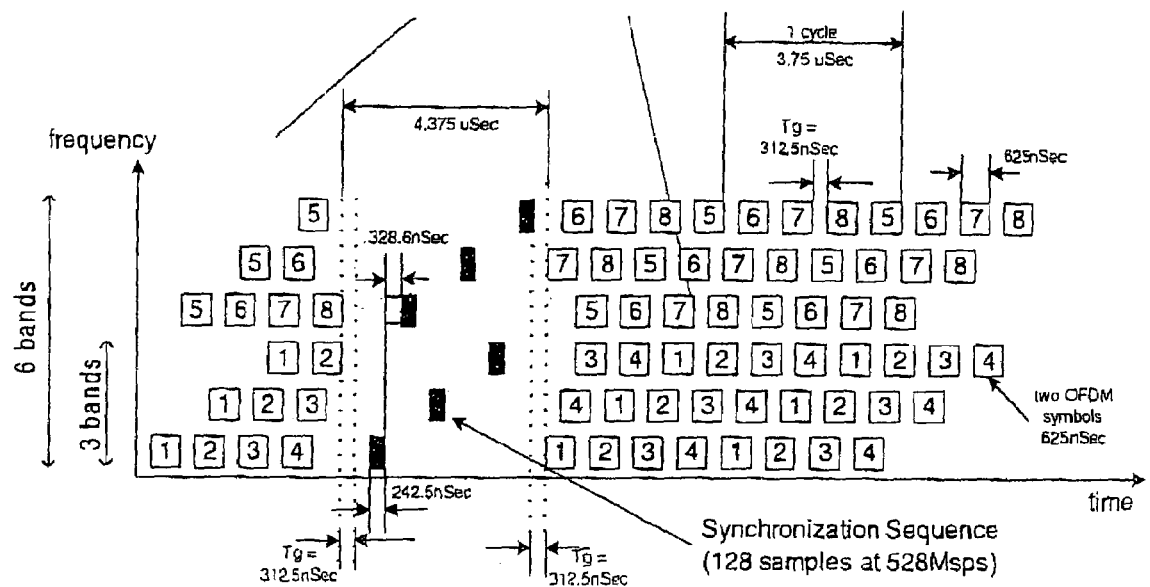
Figure 7:
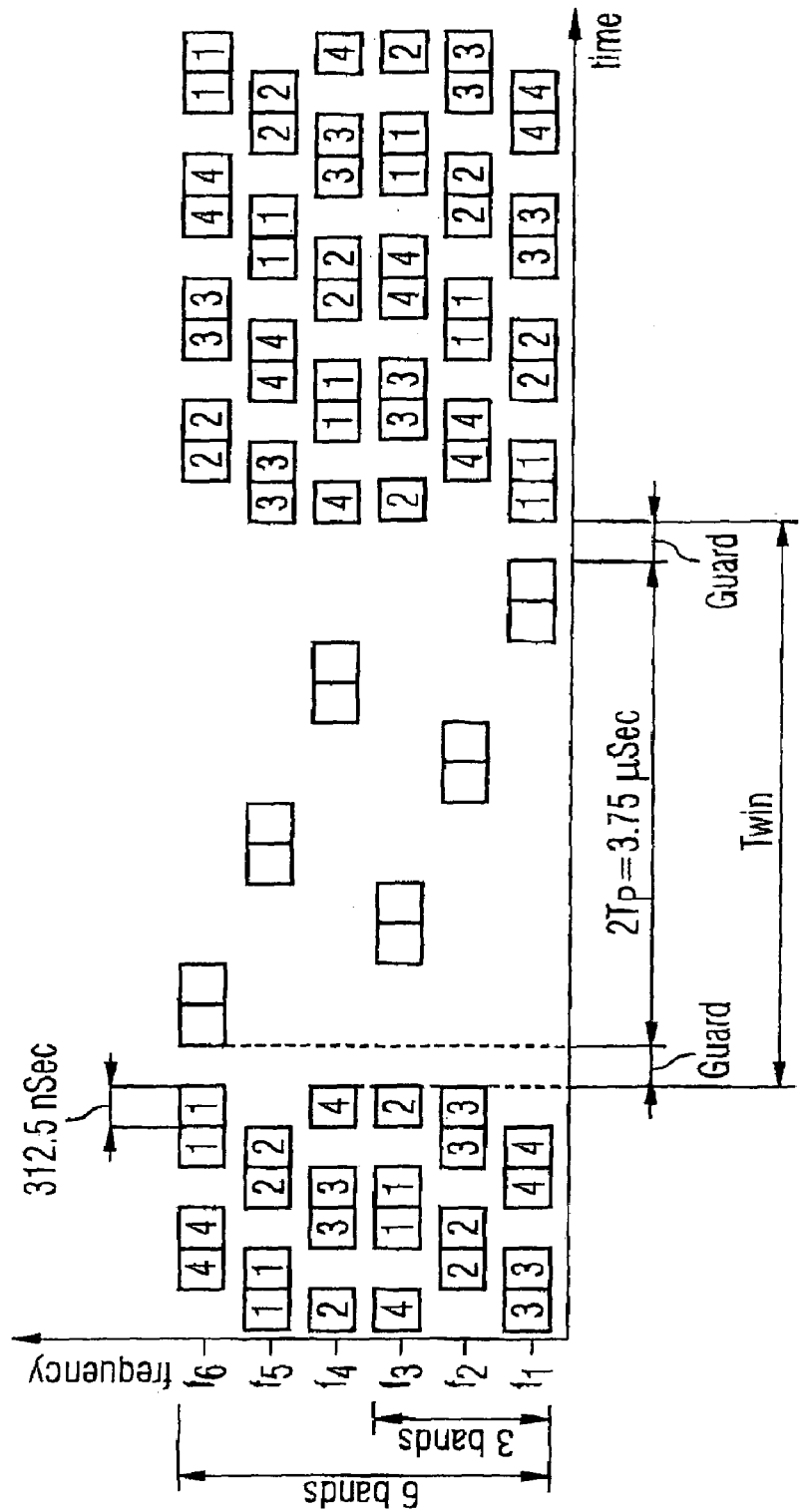
Figure 8:
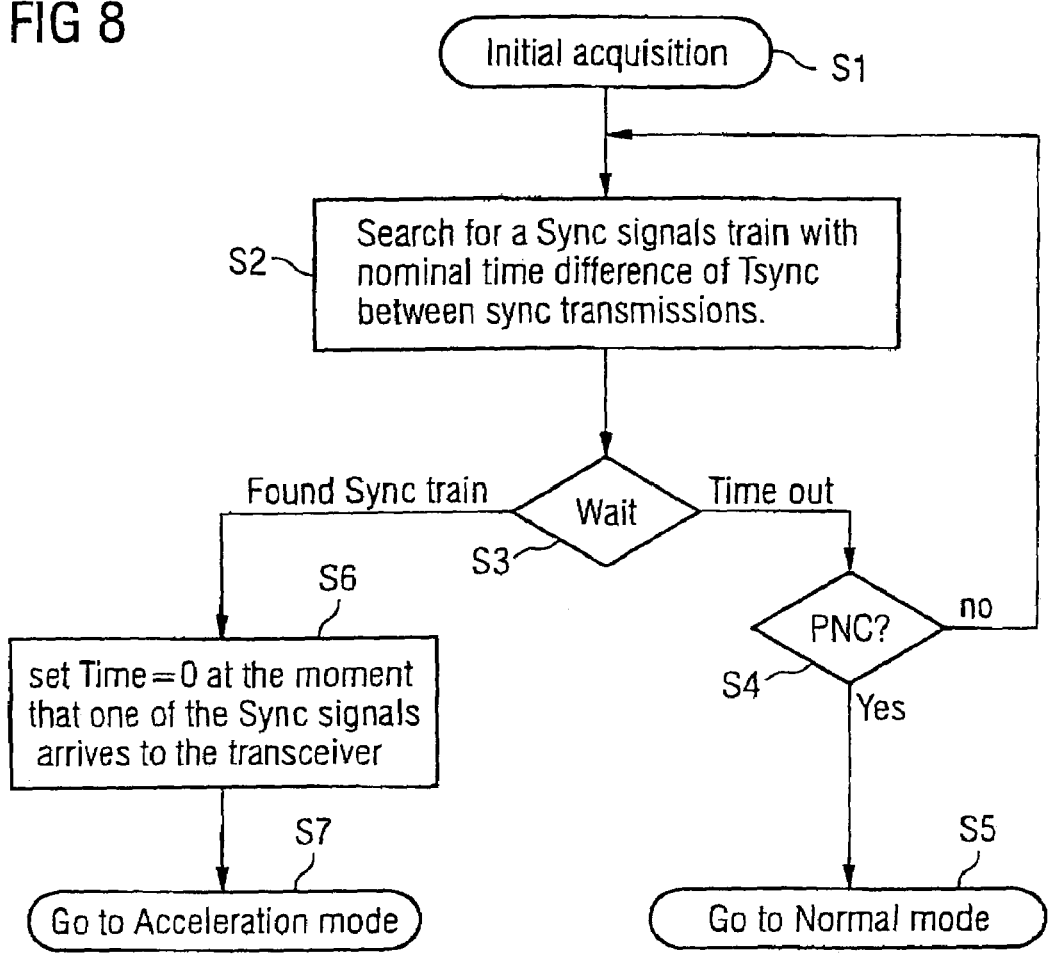
Figure 9:
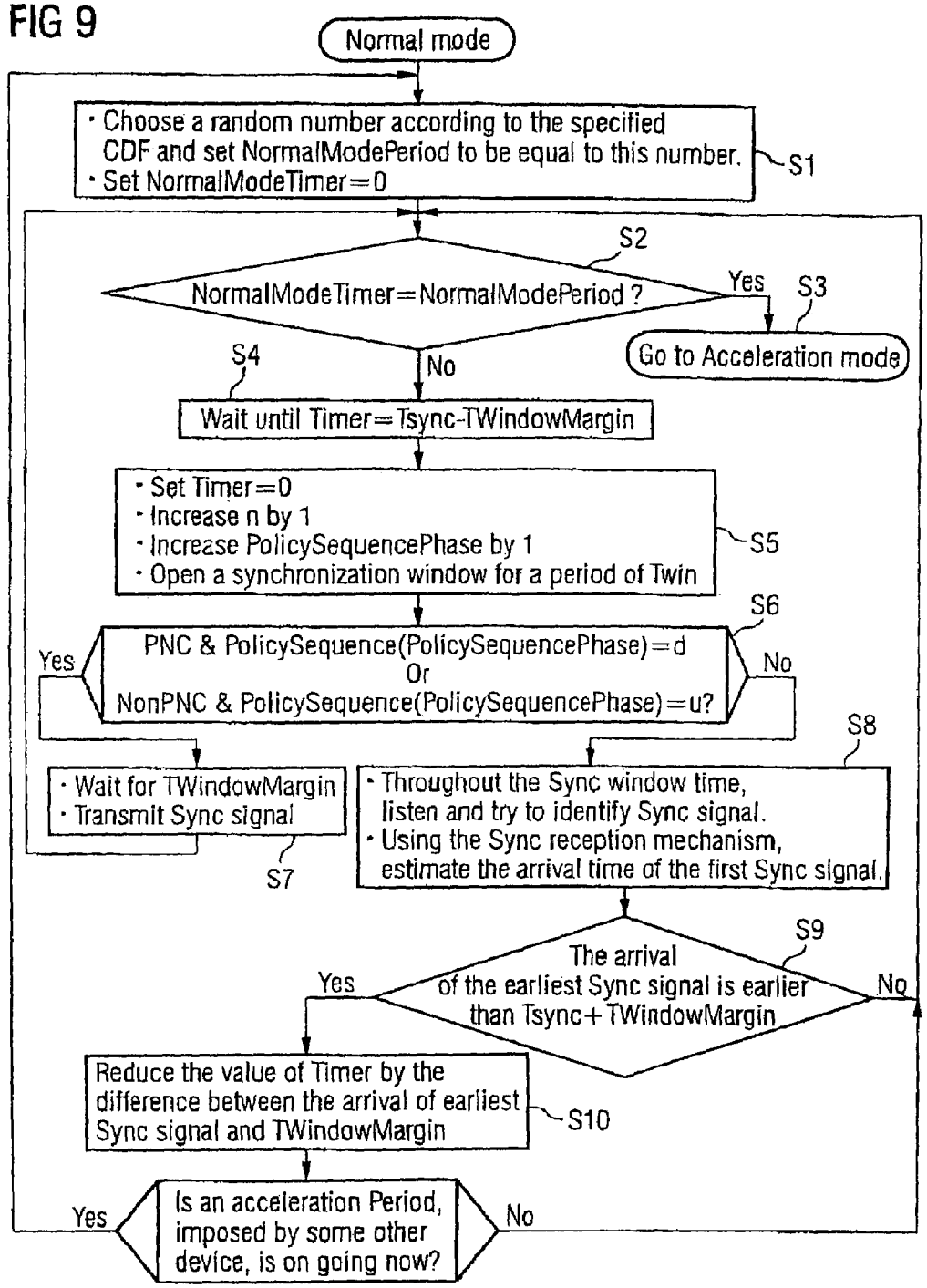
Figure 10:
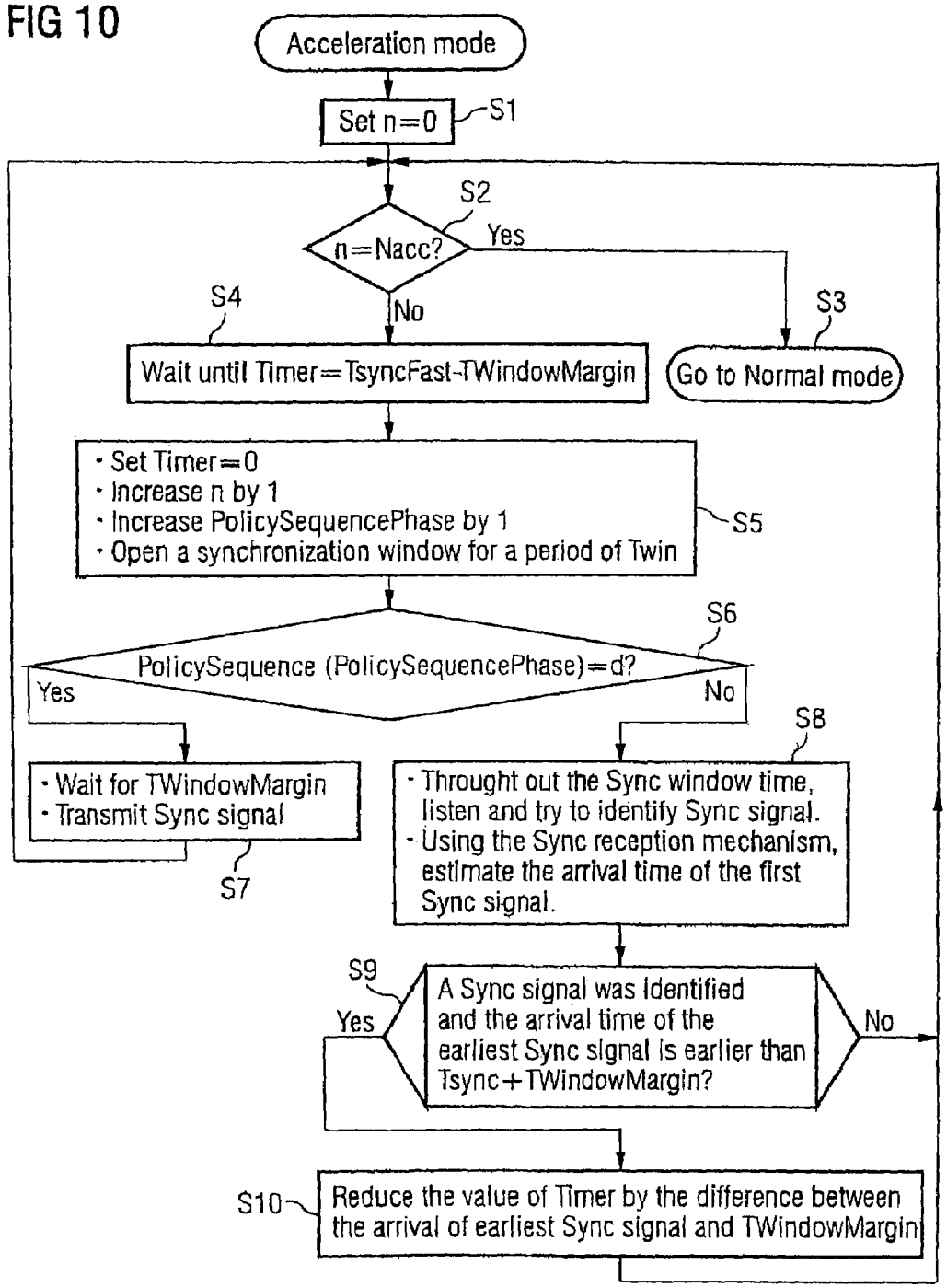
Figure 11:
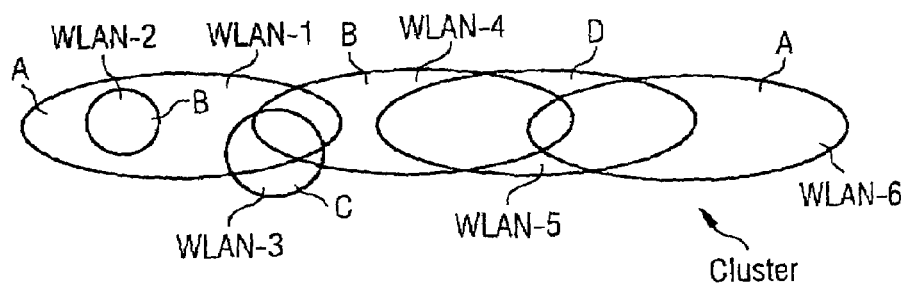
Figure 12:
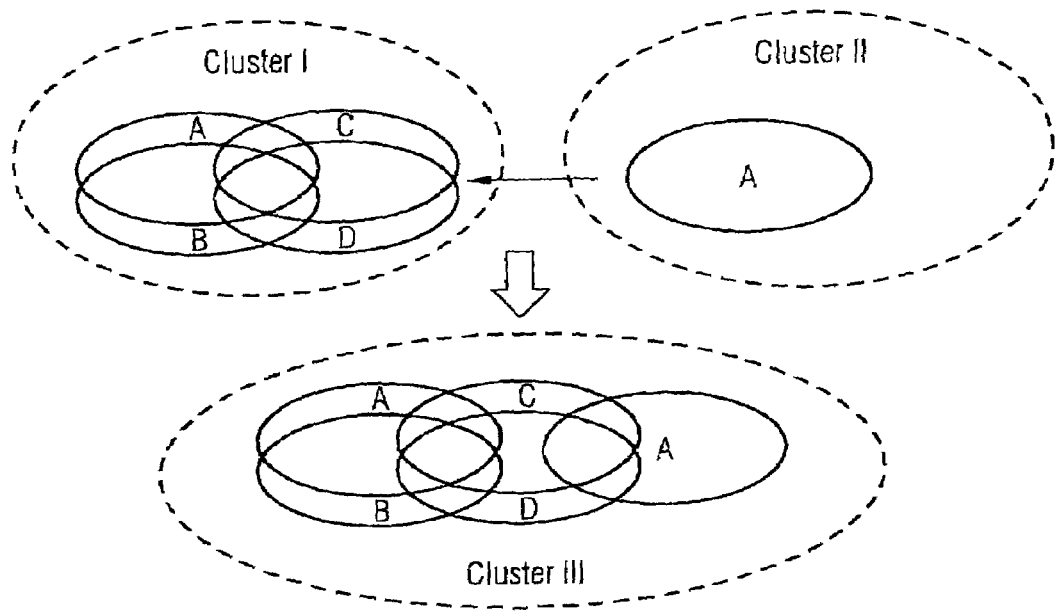
Figure 13:
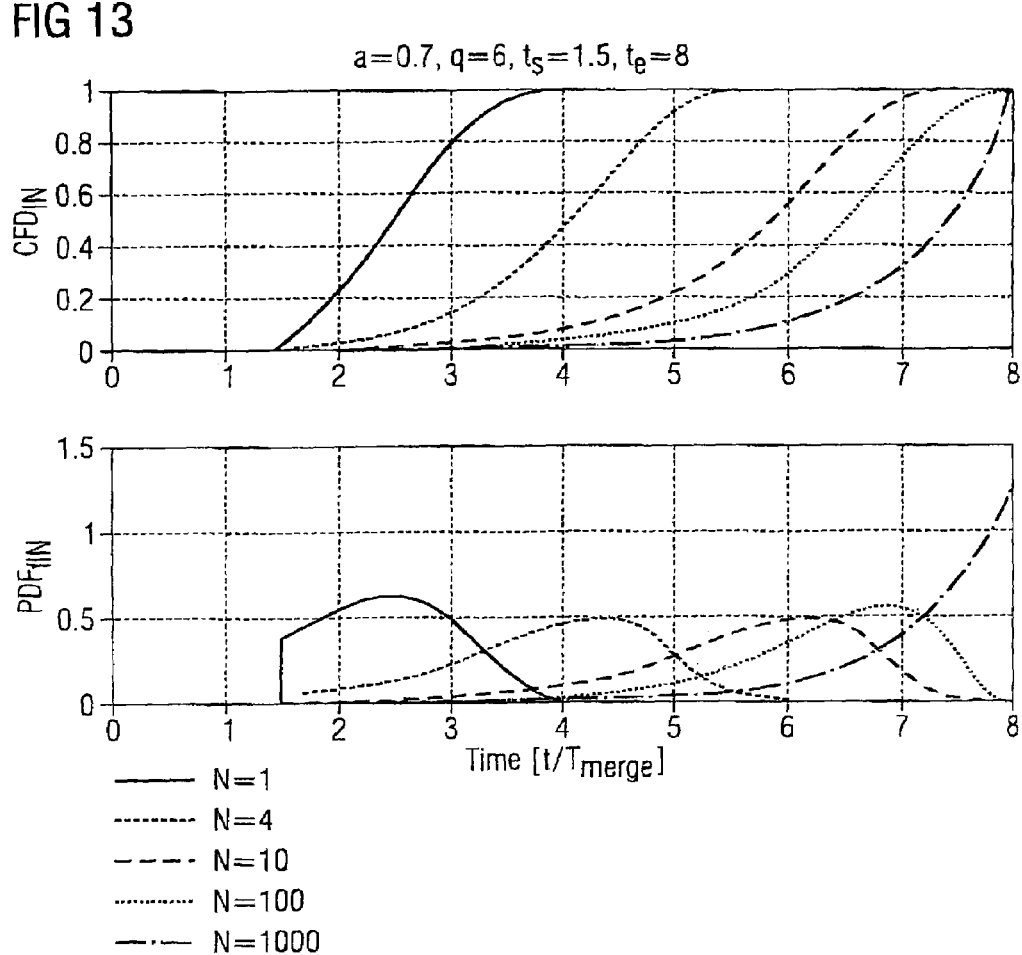
Figure 14A:
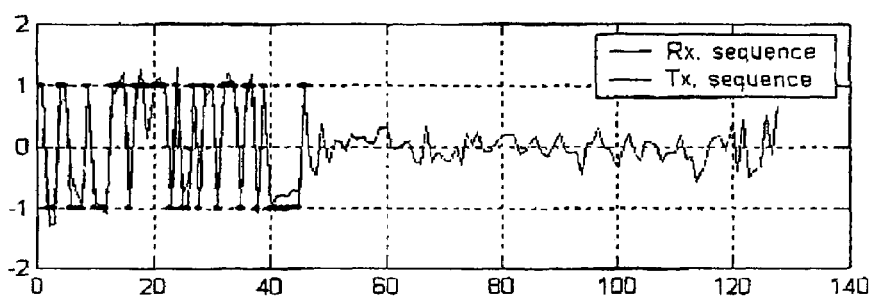
Figure 14B:
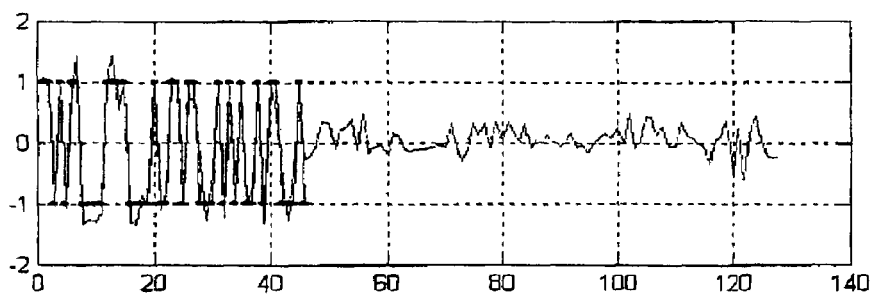

FIGS. 5a, b show timing diagrams illustrating the transmission of a synchronizing signal according to a preferred embodiment of the method for data transmission according to the present invention;

FIGS. 6a, b show timing diagrams illustrating the transmission of a synchronizing signal according to the first and third embodiment of data transmission method according to the present invention;

FIG. 7 shows a timing diagram illustrating the transmission of a synchronizing signal in a periodic synchronization time window according to the second embodiment of the data transmission method according to the present invention;

FIG. 8 shows a flow chart of the synchronization mechanism according to the present invention;

FIG. 9 shows a flow chart of a first alternative of the normal mode of the synchronization mechanism according to the present invention;

FIG. 10 shows a flow chart of the acceleration mode of the synchronization mechanism according to the present invention;

FIG. 11 shows a diagram illustrating the formation of a cluster according to the present invention;

FIG. 12 shows a diagram illustrating the merging of clusters for forming a unified cluster according to the present invention;

FIG. 13 shows a cumulative distribution function used by a preferred embodiment of the method for data transmission according to the present invention;

FIGS. 14a, 14b show timing diagrams of the synchronization sequence according to the present invention.

Figure 15:
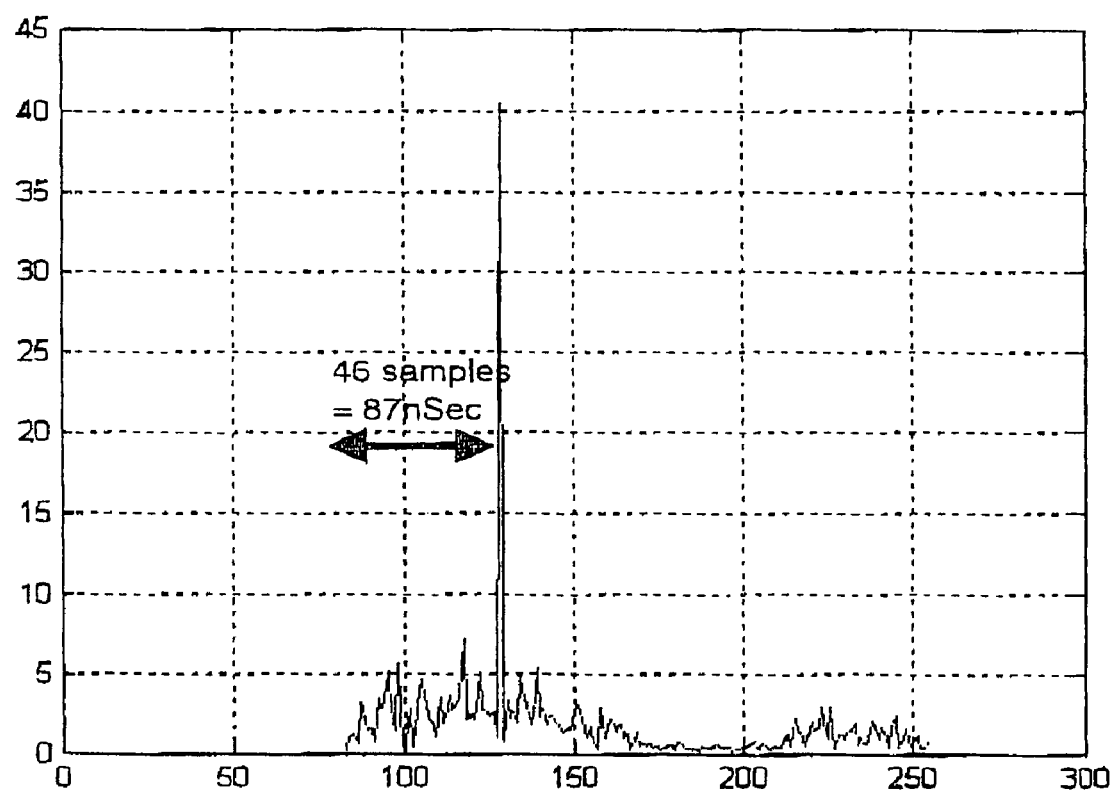

FIG. 15 shows the cross correlation of the transmitted synchronization sequence with a stored QPSK synchronization sequence according to a preferred embodiment of the invention.

Figure 3:
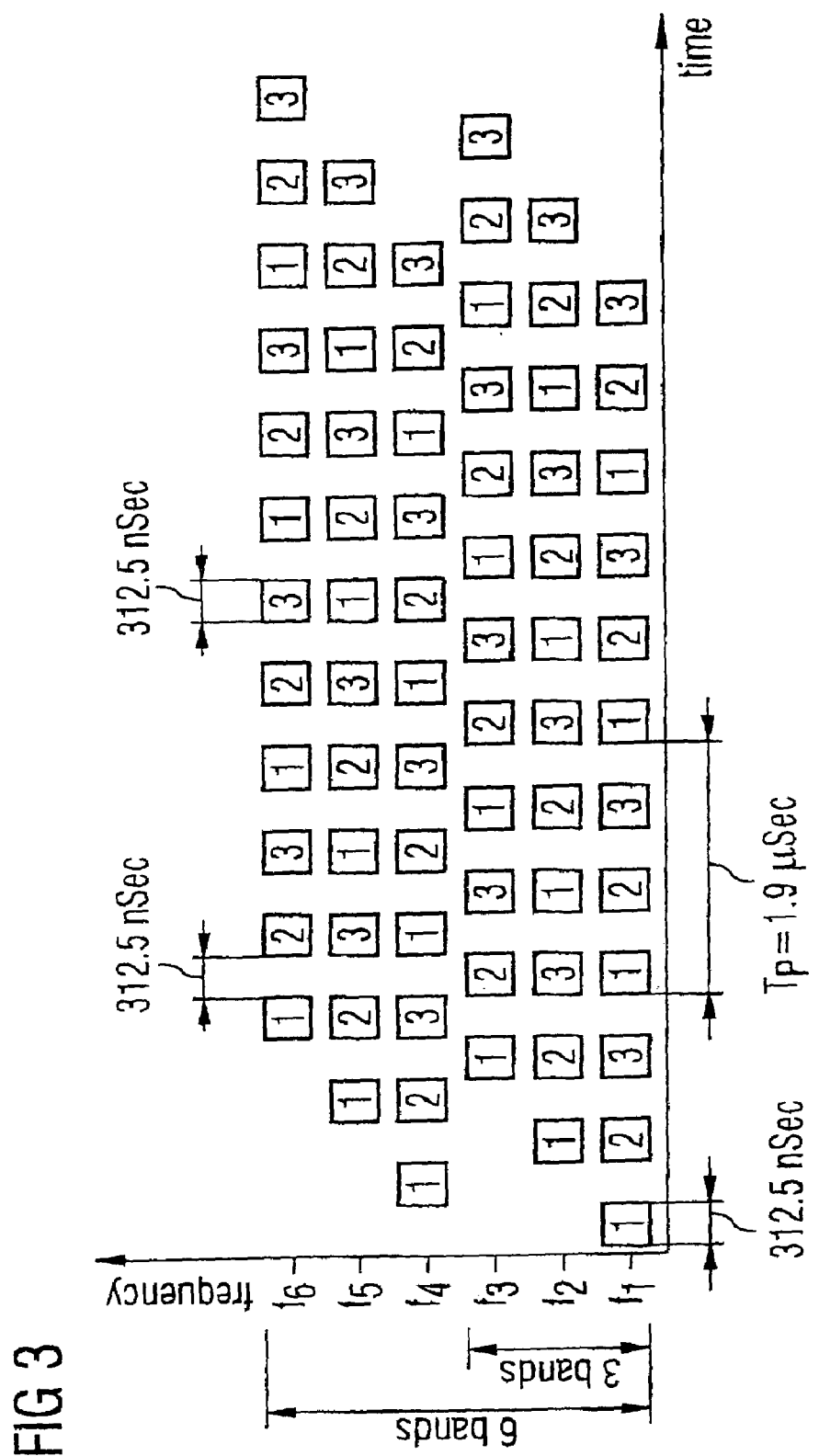
FIG. 3 show timing diagram of a data transmission within a wireless local area network (WLAN) using a first embodiment of the data transmission method according to the present invention.

FIG. 3 is a diagram illustrating a first embodiment of the method for data transmission within a wireless local area network (WLAN) having three data transmission channels 1, 2, 3 using six frequency bands. In the given example with three data transmission channels can be used by three different wireless local area networks (WLANs) or Piconets in the same local area at the same time. Each data transmission channel (i.e. channel-1, channel 2, channel 3) is used by all transceivers of the respective wireless local area network (WLAN). The data transmission is performed within continues data transmission intervals having a predetermined time length of e.g. 312.5 nsec. Within a data transmission interval no frequency hopping is performed. When the end of a data transmission interval has been reached the frequency band for the data transmission is changed to another frequency according to a predetermined frequency hopping sequence which is identical for all simultaneously operated wireless local area networks (WLANs). In the example shown in FIG. 3 the predetermined frequency hopping sequence is: F1-F4-F2-F5-F3-F6. Each data transmission channel uses the same frequency hopping sequence. Different data transmission channels are identified by their specific timing phase. In the example shown in FIG. 3 the data transmission within data transmission channel 2 is started later than the data transmission within the data transmission channel 1 wherein the time phase or time difference between both data transmission channels is two times the length of a data transmission interval, i.e. 2×312.5 nsec=625 nsec. The timing phase or time difference between two data transmission channels is the sum of the time length of the transmission interval (i.e. 312.5 nsec) and a predetermined guard time which has in the shown embodiment the same time length as the transmission interval. The guard time is necessary to avoid influences from channel propagation time and other time uncertainties.

The data transmission between two transceivers of the same wireless local area network (WLAN) is performed half-duplex, i.e. a transceiver either transmits data during a data transmission interval or it receives data during the data transmission intervals The data transmission is performed using data packages, wherein a package is usually transmitted using a plurality of data transmission intervals.

Each wireless local area network (WLAN) has at least one coordinating transceiver (PNC) for managing the data traffic within the wireless local area network (WLAN). In the given example of FIG. 3 three wireless local area networks (WLANs) using three different data transmission channels are provided each having a coordinating transceiver PNC for managing the data traffic within the respective data transmission channel.

Besides the coordinating transceiver PNC each wireless local area network (WLAN) has several additional transceivers for instance 10 to 100 transceivers. A transceiver which wishes to send data to another transceiver of the same wireless local area network (WLAN) sends a request to its respective coordinating transceiver (PNC) which allocates data transmission intervals to the requesting transceiver.

To each transceiver at least one data evaluating device may be connected, such as a computer.

A transmitting transceiver of a wireless local area network (WLAN) transmits a signal that conveys data to a receiving transceiver of the same wireless local area network (WLAN) during the data transmission intervals with changing frequency bands. With each new data transmission interval the frequency band is changed in a cyclical order according to the predetermined frequency hopping sequence. The frequency hopping sequence is identical for all wireless local area networks (WLANs).

FIG. 4a shows a further second embodiment of the method for data transmission according to the present invention wherein four data transmission channels for four wireless local area networks (WLANs) are provided using six frequency bands. In the embodiment shown in FIG. 4a the same guard time of 312.5 nsec is used. To maintain the same data rate as in the first embodiment shown in FIG. 3 the time length of data transmission time intervals used in any frequency band is doubled. Accordingly the data transmission interval in the first embodiment shown in FIG. 3 lasts 625 nsec and the guard time is still 312.5 nsec. The frequency hopping sequence in the embodiment shown in FIG. 4a is the same sequence as shown in FIG. 3, i.e. F1-F4-F2-F5-F3-F6.

Figure 4B:
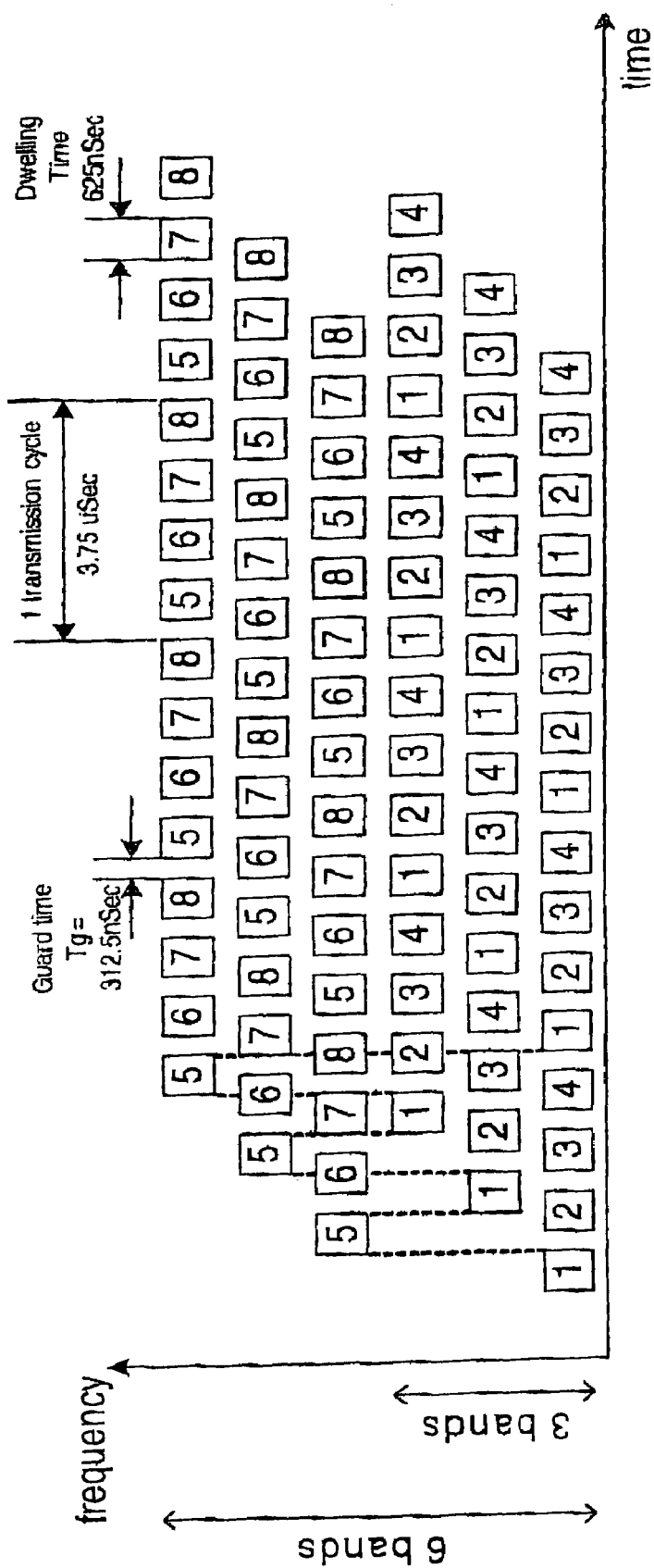

FIG. 4b is a diagram illustrating an alternative third embodiment of the method for data transmission within a wireless local area network (WLAN) having eight data transmission channels and using six different frequency bands.

The transmitting transceivers of different wireless local area networks (WLANs) start the respective data transmission at shifted times to establish different data transmission channels or each wireless local area network (WLAN). Each data transmission channel is identified by the respective timing phase. To establish a timing phase a reference time point for all data transmission channels is necessary. Accordingly all transceivers of all wireless local area networks (WLANs) which are operated in the same local area are synchronized to each other.

FIG. 5a shows a timing diagram of the data transmission wherein the synchronizing signal is transmitted during a periodic synchronization time window $T_{win}$. The synchronization time window has a predetermined time length ($T_{window}$). The synchronization time window is opened periodically with a time period $T_{sync}$. In an embodiment each transceiver either transmits or receives a predetermined synchronization signal (sync) during the periodic synchronization time window. Whether the transceiver transmits the predetermined synchronizing signal (sync) or receives the predetermined synchronizing signal is decided by a first synchronization policy sequence. The first synchronization policy sequence indicates whether the synchronization time window is an uplink synchronization time window (U-TW) or a downlink synchronization time window (D-TW). During an uplink synchronization time window (U-TW) the coordinating transceiver (PNC) of a wireless local area network (WLAN) receives a synchronization signal (sync) from other transceivers of the same wireless local area network (WLAN) whereas during a downlink synchronization time window (D-TW) the other transceivers of the wireless local area network (WLAN) receive the synchronization signal (sync) from its coordinating transceiver (PNC).

Consequently a normal transceiver within a wireless local area network (WLAN) transmits a synchronization signal within a synchronization time window when the synchronization policy sequence indicates that this synchronization time window is an uplink synchronization time window (U-TW) and the normal transceiver receives a synchronizing signal (sync) when its synchronization policy sequence indicates that the respective synchronization time window is a downlink synchronization time window (D-TW).

Figure 5B:
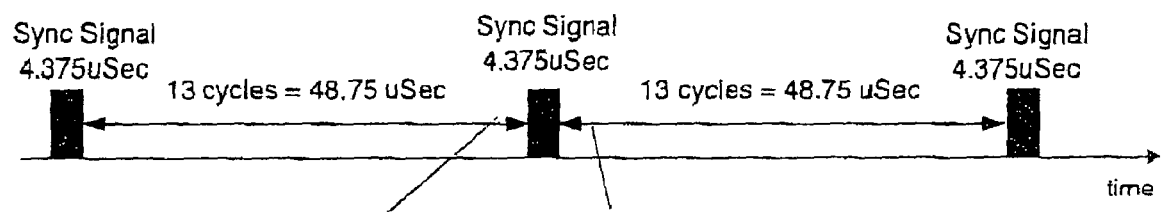

FIG. 5b shows a timing diagram of the data transmission with a synchronizing signal which is transmitted during every thirteen transmission cycles. Thirteen transmission cycles is an arbitrary selection of Tsync/Tp for getting a Tsync around 50 uSec. There is no restriction to this number of cycles. In a preferred embodiment every Tsync all transceivers both transmit and receive. In all embodiments it is required that there is an INTEGER number of Tp (T period) between two Sync signals. If Tp=3.75 uSec as in FIG. 4a, then a cycle number of 13 is fine. If Tp=1.9 uSec then 6 or 7 cycles are used for getting a similar Tsync.

A coordinating transceiver (PNC) within a wireless local area networks (WLANs) sends a synchronizing signal during a synchronizing transmission time window when the synchronization policy sequence indicates that the time window is a downlink synchronization time window and it does listen to a synchronizing signal when the respective synchronization policy sequence indicates that the synchronization time window is an uplink time window.

FIG. 6a shows a transmission of a synchronizing signal within a synchronization time window during synchronization transmission intervals. Like the data transmission the transmission of the synchronizing signal is performed during transmission intervals with changing frequency bands. The frequency hopping when transmitting a synchronization signal during the synchronization transmitting intervals is performed according to a synchronization frequency hopping sequence. The frequency band is changed with each new synchronization transmission interval in a predetermined cyclical order.

As shown in FIG. 6a in a preferred embodiment the order of frequency bands of the synchronization frequency hopping sequence is reversed to the order of frequency bands of the frequency hopping sequence used for the data transmission. As can be seen from FIG. 6a the synchronization frequency hopping sequence is F6-F3-F5-F2-F4-F1, i.e. reverse to the frequency hopping sequence used for the data transmission F1-F4-F2-F5-F3-F6. The length of the transmission intervals transmitting the synchronizing signal (sync) is in a preferred embodiment the same as the length used for the data transmission, i.e. 312.5 nsec. In the embodiment shown in FIG. 6a a synchronization signal is transmitted with a cyclical frequency hopping order using six frequency bands, i.e. during twelve transmission intervals. A guard time of 312.5 nsec is observed at the beginning and at the end of the transmission of the synchronizing signal.

In a preferred embodiment the synchronization frequency hopping sequence is the same as used for the data transmission, e.g. F1-F4-F2-F5-F3-F6.

FIG. 6b shows a transmission for synchronizing signal within a synchronization time window during the synchronization transmission intervals according to a preferred embodiment of the present invention.

Each synchronization sequence includes 128 synchronization samples at a rate of 528 MSPS. In the embodiment shown in FIG. 6b eight channels are used as in the third embodiment shown in FIG. 4b. The synchronization signals is composed of a synchronization sequence per frequency band. Each synchronization sequence is 242.4 nSec long (128/528 MHz). In the embodiment shown in FIG. 6b each synchronization sequence is preceded by 382.6 nSec listening time window (202/528 MHz) which is used for listening to synchronization signals which precede the own transmission of a synchronization signal by the transceiver. The synchronization signal according to the embodiment shown FIG. 6b enables a detection by a 87 nSec correlator instead of 242.5 nSec.

With the preferred synchronization signal shown in FIG. 6b the synchronization error can be reduced. This reduces the synchronization error and consequently reduces the inter-channel guard time.

A synchronization sequence detector is provided for each frequency band. The synchronization detection is declared by the earliest sequence detection among the frequency bands.

The synchronization error (the timing uncertainty) is composed of a drift effect, a propagation delay effect, a near-far effect and an Rx-Tx switching effect. The drift effect is a result of the relative clock skew between devices, accumulated over $T_{syns}$. For $T_{syns}$=53.125 µs a skew=240 PPM results in maximal drift effect of 240 ppm·53.125 µs=13 ns. For a maximal 15 m distance between interacting devices the propagation delay effect is limited to 2·15 m/c=100 ns, wherein a synchronization sequence propagation delay (of 15 m/c) and a data propagation delay (of 15 mc) are considered, wherein c is the speed of the light (c=3·10⁸ m/sec). Further the synchronization error includes a near-far-effect which is defined by the duration that a near synchronization signal transmitter masks detection of earlier synchronization signals. This effect can be limited to 87 nSec by using a good selection of the synchronization sequence and a good selection of the detection scheme. The transmitter and the interferer may synchronize each other via a third transceiver, i.e. as a receiver. Therefore two errors of 87 nSec are considered. The overall near-far effect over the synchronization timing uncertainty is therefore limited to 2·87 nSec=174 nSec. The synchronization error further comprises RX-TX-switching time effects (<2·9.5 nSec=19 nSec). Again the transmitter and the interferer may synchronize each other via a third transceiver. Therefore two errors of 9.5 nSec (an assumed switching time) have to be considered. Summarizing the total synchronization error is smaller than 306 nSec. The reduced synchronization error leads to a reduced guard time.

As can be seen from FIG. 6b in a preferred embodiment every receiver detects a synchronization signals that precedes its own transmission of a synchronization signal during listening time windows of 382.6 nSec length. These listening time windows enable a frequency band switching and switching to reception (RX) lasting 9.5 nSec (5 samples) a noise level estimation lasting 100.4 nSec (53 samples), a sensing time (176 nSec+87 nSec corresponding to 93+46 samples) and a switching time to transmitting (9.5 nSec corresponding to 5 samples). Each transceiver first listens to detect a synchronizing signal then transmits this synchronization signal and moves then to another frequency band as can be seen in FIG. 6b.

The transceiver periodically expects a preceding synchronizing signal within a time period that equals the maximal drift effect (for example 13 nSec for 240 PPM and $T_{syns}$=53·125 μs) Therefore a sensing time of 176 nSec is robust against 13 consecutive misdetections. Accordingly the detector within each frequency band is designed by threshold selection for false alarm with a probability of <$10^{-12}$ within a 176 nSec intervall. The over all false alarm (3 frequency bands with a probability of <$3 \cdot 10^{-12}$ corresponds to a false alarm every 205 days (1/205 days) assuming $T_{syns}$=53.125 μs. When assuming a miss-detection within each frequency band of 0.4 with results in miss-detection for 3 frequency bands <0.064, so that a sequence of 13 consecutive misdetections has a probability of <$3 \cdot 10^{-16}$.

For meeting the lowest throughput (55 Mbps) required for the IEEE 802.15.3a, an SNR of −0.6 dB is required within transmission intervals of TFI-OFDM when a ⅙ per-band transmission duty cycle is used. If the duty cycle within synchronization signals is below 1/12 (less then 300 nSec for 3750 nSec transmission cycle is 3750 nSec, then the SNR within the synchronization transmission sequence of a transmitter that is received at the lowest throughput is 2.4 dB. This SNR within a 242.4 nSec (128 samples at 528 MHz sampling rate) is detectable with much lower miss-detection rate, compared to the 0.4 miss-detection requirement that is presented above. Reliable synchronization is possible with transmitters which are significantly more distant then the devices that are close enough for communication.

FIG. 7 shows the transmission of a synchronizing signal within a system using four data transmission channels and six frequency bands. In the shown embodiment the length of the transmission intervals used for transmitting the synchronizing signal has the same time length as the data transmission intervals.

All transceivers having a distance or signal range to exchange signals open a synchronization time window at the same time+/−some time uncertainty. Every transceiver which decides according to its policy sequence to work as a receiving transceiver in a certain synchronization time window detects the arrival time of the synchronization signal (sync).

In a preferred embodiment the transceiver receiving a signal during a synchronization time window correlates the received signal with an expected synchronization signal to generate a correlation signal. As many transmitters may be active and many signal paths may exist for each transmitted signal the receiving transceiver identifies many peaks at the output of its correlator.

Accordingly in the preferred embodiment the transceiver detects the time of the first signal peak of the generated correlation signal as the arrival time of the synchronization signal and compares the detected arrival time with an expected time of reception for a synchronization signal sent by himself. If the received signal peak is earlier than the expected peak then the receiving transceiver aligns its synchronization period to match the detected arrival time of the synchronization signal by resetting his synchronization timer. If the received peak of the correlated signal is not earlier than the expected arrival time the synchronization timer is not reset. The consequence is that the synchronization period of any transceiver is set by the fastest transceiver in the neighborhood. The synchronization time windows are also used by the transceivers for alignment of the frequency hopping phase.

In a preferred embodiment the autocorrelation function of the synchronization signal approximates an impulse function.

In the data transmission system having four data transmission channels as shown in FIG. 7 four different policy sequences are defined. Each Piconet or wireless local area network (WLAN) comprises its own synchronization policy sequence, s1=[d,d,d,u,u,u]
s2=[d,d,u,u]
s3=[d,u]
s4=[d,d,u]

All transceivers in a specific Piconet or wireless local area network (WLAN) share the same policy sequence, i.e. transceivers in Piconet1 use sequence s1, transceivers in Piconet2 use sequence s2, transceivers in Piconet3 use sequence s3 and transceivers in Piconet4 use policy sequence s4.

Each synchronization window is related to a certain timing phase in the policy sequence and all devices in a predetermined Piconet have the same phase within the policy sequence. The coordinating transceiver PNC is responsible for alignment of all transceivers within the Piconet to the same phase within the policy sequence. The synchronization receive/transmit policy achieves that within a specific wireless local area network (WLAN) a synchronization timing update from any transceiver to any other transceiver within the same wireless local area network (WLAN) is delivered within $4 \times T_{sync}$ at the most.

The worst case is when policy sequence s1 is used and u, u, u, d phases are following. Any transceiver or coordinating transceiver will deliver its synchronization timing update to other transceivers or coordinating transceivers of other Piconets which are within its range in less than;

$4 \times T_{sync}$ for Piconets 1 and 2
$4 \times T_{sync}$ for Piconets 2 and 3
$6 \times T_{sync}$ for Piconets 3 and 4
$6 \times T_{sync}$ for Piconets 1 and 4
$6 \times T_{sync}$ for Piconets 1 and 3
$9 \times T_{sync}$ for Piconets 2 and 4

For neighboring channels, i.e. 1-2, 2-3, 3-4, 4-1 the maximum time delay is $7 \times T_{sync}$. In a steady state situation all transceivers are synchronized by synchronizing signals that come from any other transceiver within their signal range.

For two transceivers belonging to the same wireless local area network (WLAN) the maximum time for a synchronizing signal to be delivered from one transceiver to another depends on the synchronization policy sequence of this wireless local area network (WLAN). In the given example of the wireless local area network (WLAN) this time is $4 \times T_{sync}$.

For two transceiver belonging to different wireless local area networks (WLANs) the time to deliver synchronization signals may increase up to $7 \times T_{sync}$ for neighboring data transmission channels.

The first contribution to timing uncertainties originates from the propagation time of the signal between two transceivers.

The second contribution to timing uncertainties originates from differences in the synchronization frequencies due to the drift of the system frequency source.

Timing phase uncertainly between a legitimate transceiver and interferer as seen by the receiving transceiver is caused by the propagation time delay through the data transmission channel and the drift due to variation in frequency sources.

To avoid negative influences caused by timing phase uncertainties a guard time between different Piconets is provided.

For typical distances between transceivers of about 15 m and typical synchronization time $T_{sync}$=93.75 msec, a frequency deviation of +/−20 ppm using the above described policy sequences the maximum time uncertainty is $$200 \text{ nsec} + 26.25 \text{ nsec} = 226.25 \text{ nsec}.$$

In a preferred embodiment a guard time of 312.5 nsec is implement which is long enough for avoiding time phase uncertainties.

FIG. 8 shows a flow chart of a preferred embodiment of the synchronization mechanism within a wireless local network (WLAN) according to the present invention.

In a first step S1 a transceiver is switched on and an initial acquisition is performed.

In a step S2 the transceiver searches for synchronization signal trains with a nominal time difference of $T_{sync}$ between synchronization signal transmissions.

The transceiver checks in a step S3 for a predetermined time whether a synchronizing signal has been detected. When a waiting time has passed without detecting the synchronizing signal the transceiver checks in a step S4 whether it is defined as a coordinating transceiver or Piconet coordinator PNC. If the transceiver is a normal transceiver and not a coordinating transceiver PNC the process returns to step S2 and the transceiver further searches for a synchronizing signal. If the transceiver decides in step S4 that it is a coordinating transceiver PNC it enters a subroutine for a normal mode in step S5.

If in step S3 the transceiver detects a synchronizing signal it resets in step S6 its timer to zero when one the synchronizing signal arrives. Then an acceleration mode subroutine is entered in step S7.

FIG. 9 shows a first alternative of the normal mode subroutine performed by a transceiver according to the present invention.

In a step S1 the transceiver selects a random number according to a specified cumulative distribution function (CDF) and sets a normal mode period to be equal to this selected number. An Example for a cumulative distribution function CDF is shown in FIG. 13. Further a normal mode timer is reset to zero.

In a step S2 the transceiver checks whether the normal mode timer has reached a normal mode period which is a predetermined adjustable parameter. If the normal mode timer has already reached the normal mode period the process continues with the acceleration mode routine in step S3.

If the normal mode timer has not yet reached the normal mode period the transceiver waits until another timer has reached a time difference between the synchronization time $T_{synch}$ and the synchronization time window margin in step S4. The time window margin is shown in FIG. 5.

In a further step S5 the timer is set to zero, the variable n is incremented and the predetermined policy sequence of the transceiver is set to the next phase. The transceiver opens then a synchronization time window $T_{win}$.

In a step S6 the transceiver decides according to his policy sequence Si whether it is transmitting a synchronizing signal sync or whether it listens for reception of a synchronizing signal.

When the transceiver decides that it is due to transmit a synchronizing signal it waits for the synchronizing time window margin and transmits the synchronizing signal in step S7. Then the process returns to step S2.

If the transceiver decides in step S6 that it has to receive a synchronizing signal it listens throughout the synchronization time window and tries to identify the expected synchronizing signal in step S8. The transceiver estimates the arrival time of the first synchronizing signal sync.

In step S9 the transceiver decides whether the arrival time of the earliest synchronizing signal is earlier than the sum of the synchronizing time and the synchronizing time window margin.

In case that the arrival time is not earlier the process returns to step S2.

In case that the arrival time of the earliest synchronizing signal is earlier than the sum of the synchronizing time and the synchronizing time window margin the value of the timer is reduced by the difference between the arrival of the earliest synchronizing signal and the synchronizing time window margin in step S10.

In step S11 the transceiver checks whether an acceleration period is performed by another transceiver. If an acceleration period is performed by another transceiver the process returns to step Si. If no other transceiver performs an acceleration period the process returns to step S2.

FIG. 10 shows a preferred embodiment of an acceleration mode subroutine used by a transceiver according to the present invention.

In a step S1 a variable n is set to zero.

In a step S2 the transceiver checks whether the counter n has reached a parameter $N_{ACC}$. If the counter had reached this parameter the process goes to the normal mode subroutine in step S3.

If the counter has not reached the parameter $N_{ACC}$ in step S2 the transceiver waits until its timer has reached the time difference between the fast synchronization time period $T_{sync\ fast}$ and the synchronization time window margin in step S4.

The adjustable parameter $T_{sync\ fast}$ is smaller than the adjustable timer parameter $T_{sync}$.

As in the step S5 of the normal mode the transceiver gets in the acceleration mode in step S5, sets its timer to zero, increments a counter n, shrifts the policy sequence to the next phase and opens a synchronization time window for a predetermined time $T_{window}$.

In step S6 the transceiver checks whether it has to transmit or receive a synchronizing signal during the synchronization time window.

In step S7 the synchronizing signal is transmitted and the process returns to step S2.

If the transceiver has decided to listen it tries to identify the synchronization signal in step S8 and estimates the arrival time of the first synchronizing signal.

In step S9 it is checked whether the arrival time of the earliest synchronizing signal is earlier than the sum of the synchronizing time $t_{sync}$ and the time window margin.

In case that the arrival time of the earliest detected synchronizing signal is earlier than the sum of the synchronizing time $t_{sync}$ and the time window margin the value of the timer is reduced by the difference between the arrival time of the earliest sync-signal and the time window margin in step S10. Then the routine returns to step S2.

The main difference between the two modes as shown in FIG. 9, 10 is that the synchronizing time $T_{sync}$ as defined in step S4 of the normal mode is shorter than in step 4 of the acceleration mode as shown in FIG. 10. All visible transceivers in a local area, i.e. all transceivers within a predetermined range, are synchronized to each other in a steady state situation.

The method for data transmission according to the present invention allows that the transceivers can be moveable and in particular that the transceivers can move out or move in signal ranges of other transceivers belonging to other wireless local are networks.

Two transceivers of possible different Piconets (WLANs) are synchronized to each other if they detect a synchronizing signal of each other during the synchronization time windows.

Once all transceivers are synchronized any two transceivers that see each other, i.e. which are in the signal range, and which belong to the same wireless local area network can transmit or receive data without any interference from another transceiver in the same area.

The synchronization mechanism has the effect that the time difference between the local times of the transceivers which see each other is limited. The time difference depends on the distance between the transceivers and the frequency drift. To avoid influences from time certainties the guard time is provided.

The synchronization avoids in a steady state situation a collision between transceivers which can see each other.

In many situations a moveable transceiver or moveable transceivers of the different wireless local LAN approach a cluster of different wireless local area networks. A cluster is a group of transceivers including coordinating transceivers PNCs belonging to one or more wireless local area networks.

All transceivers within a cluster are synchronized to each other, i.e. for any two transceivers within a cluster exists at least one signal route for synchronization signal delivery. Since all transceivers within the cluster see each other, i.e. are within a predetermined signal range, they are synchronized to each other so that steady state conditions are kept within a cluster.

FIG. 11 shows an example of a cluster comprising six wireless local area networks which operate on four different data transmission channels A, B, C, D. In the given example as shown in FIG. 11 a wireless local area network WLAN1 uses the same data transmission channel A as another wireless local area network WLAN6. As can be seen the wireless local area network WLAN1 does not overlap with wireless local area network WLAN6 so that both local area networks can use the same data transmission channel A. In the given example a wireless local area network WLAN2 uses the same data transmission channel B as wireless local area network WLAN4. Both wireless area network WLAN2, WLAN4 do not overlap. As shown in FIG. 11 the wireless local area network WLAN1 overlaps with wireless local area networks WLAN2, WLAN3 and WLAN4. The overlapping network WLAN4 overlaps with wireless local area networks WLAN5 and WLAN6.

A cluster may contain more wireless local area networks (WLANs) than the number of data transmission channels supported by the data transmission system This makes it possible to reuse the same data transmission channels in separated areas.

In the given example the wireless local area networks WLAN1 and WLAN6 do not see each other, i.e. they do not overlap, but they are nevertheless synchronized to each other via the overlapping network WLAN 4.

The synchronized transceivers of a cluster transmit or receive the predetermined synchronizing signal sync during the periodic synchronizing time window which is opened with a specific synchronization frequency.

FIG. 12 shows a situation when two clusters I, II approach each other and merge to form a unified cluster III. In the given example cluster I comprises four wireless local area networks overlapping each other and using four different data transmission channels A, B, C, D. Cluster II comprises only one wireless local area network WLAN using data transmission channel A. After two clusters I, II have approached each other and come into the signal range of each other the wireless local area network using data transmission channel A of cluster II overlaps in the given example the data transmission channels of cluster I which use data transmission channels C, D. In this situation no collision occurs since in the unified cluster III no wireless local area network overlaps with another wireless local area network using the same data transmission channel.

If a cluster approaches another cluster a fast synchronization between the two clusters is performed. The synchronization frequencies of separate clusters of such as cluster I, II are different A coordinating transceiver (PNC) of a wireless local area network (WLAN) within a cluster increases the synchronization frequency of this cluster at random time for a predetermined acceleration period which enables merging of that cluster with another cluster. The coordinating transceiver (PNC) selects a random time according to a cumulative distribution function (CDF).

In a preferred embodiment the cumulative distribution function is $$CDF(t) = \begin{cases} 0 & \text{if } t \leq s \\ \dfrac{q^t - q^s}{q^t - q^s} & \text{if } s \leq t \leq ue \\ 1 & \text{if } t > e \end{cases}$$

An example for a cumulative distribution function is shown in FIG. 13. FIG. 13a shows the cumulative distribution function and FIG. 13b a derivative of the cumulating distribution function for the actual time of a acceleration period in a cluster. FIGS. 13a, b show graphs for clusters with a different number of wireless local area networks N. It can be seen from FIG. 13 that the distribution function for the actual time is similar for a high number of wireless local area networks (WLANs) with on constant time shift.

The coordinating transceiver PNC of the wireless local area network within a cluster increases the synchronization frequency of that cluster when a timer reaches the selected random time. When the coordinating transceiver (PNC) of the wireless local area network WLAN within a cluster detects that the synchronization frequency has already been increased by another coordinating transceiver (PNC) of another wireless local area network WLAN within the same cluster it resets the timer and waits for the end of the acceleration period.

When a first cluster I having a first synchronization frequency and a second cluster II having a second synchronization frequency approach each other as shown in FIG. 12 they merge to form a unified cluster III when a synchronization frequency of the first cluster I or second cluster II has been increased for the predetermined acceleration period, so that at least one synchronization time window of the periodic synchronizing time windows of the first cluster I and the second clusters II overlap each other. The first cluster I may have a normal synchronization period of e.g. $T_{sync}$ 100 μs and cluster II may have a slightly shorter synchronization period of $T_{sync}$=99 µs. When two approaching clusters I, II see each other and both clusters work with different synchronization frequencies after a while the synchronization time windows will overlap. The cluster II with the slower synchronization frequency will get hooked and work with the higher synchronization frequency.

According to the synchronization mechanism as used as the present invention the acceleration periods are generated and are spread throughout the cluster. The exact start time of the acceleration periods is random. The appearance of acceleration periods in different clusters is independent. The provision of acceleration periods allows a synchronization between two different clusters within a very short time after they come into their signal range. When one cluster is in an acceleration period and the other cluster is not the time difference between their synchronization windows will close down until they overlap and synchronize.

The higher the acceleration level is the faster the synchronization is performed. However the acceleration level is selected to be not too high so that the transceivers of the merging clusters are able to follow. A reduction of the periodic synchronizing time $T_{sync}$ makes it possible to increase the acceleration level.

The time of synchronization during the merging process of two classes is a random variable with statistical properties that depend on many parameters.

For a realistic scenario with a frequency deviation of ±20 ppm, a nominal synchronization time period $T_{sync}$=50 µs, a chosen cumulative distribution function CDF (with the following parameters: q=529; s=0.30; e=1.6 sec), an acceleration period of 0.2 sec and an acceleration level of 300 ppm, the synchronization time will be less than 4 seconds in a probality of 90% and less than 8 seconds in a probability of 99%.

In a preferred embodiment a clear channel assessment CCA mechanism is used which enables many transceiver during a contention period to take an educated guess if it can start to transmit.

Any transceiver which is transmitting before and after a synchronization signal adds additional hopping cycles with predetermined known signals in the hopping time phase that is used in that data transmission channel. Any other transceiver in the same wireless local area network WLAN monitors that additional signaling and understands that the data transmission channel is not clear.

When merging different clusters a coordinating transceiver (PNC) of an approaching cluster establishes a Piconet and starts transferring date at the end of the acquisition phase if a sync-signal-train was found or after the first acceleration period provided that the new coordinating transceiver finds a vacant data transmission channel.

The normal transceiver approaching a cluster searches for an existing Piconet on all data transmission channels immediately after the first acceleration period. The normal transceiver then joins any of the found Piconets if it gets the approval of the respective coordinating transceiver PNC to do so. According to the embodiment that involves policy sequence, a new coordinating transceiver DNC uses a new policy sequence with an arbitrary initial policy sequence phase until it decides to establish a Piconet with a certain channel. At that point the new coordinating transceiver (PNC) starts using the policy sequence that is assigned to that data transmission channel.

According to the embodiment that involves policy sequence a coordinating transceiver (PNC) distributes the current policy sequence phase to all attached normal transceivers by means of data transfer.

According to the embodiment that involves policy sequence a new normal transceiver will use the new policy sequence with any arbitrary initial policy sequence phase until it finds a working Piconet with a certain data transmission channel to which it decides to join. The normal transceiver than extracts the policy sequence phase from data delivered by the respective coordinating transceiver PNC. Once the normal transceiver detects the right phase it starts using the policy sequence that is assigned to the Piconet's channel with the corresponding sequence phase.

Any new transceiver aligns his synchronization windows to synchronization's signals that it identifies. If the new transceiver identifies synchronization signals from more that one cluster it aligns the synchronization windows to one of the clusters. When the new transceiver is aligned with the synchronization signals of the certain cluster it starts to open synchronization windows on its own and transmit synchronization signals according to a policy sequence that is allocated to new transceivers (when the embodiment that involves policy sequence is taken). The new transceiver uses an acceleration synchronization frequency for an acceleration period. The new transceiver does not transmit data before it finishes the first acceleration period. The new transceiver looks for a vacant channel after the first acceleration period and establishes a Piconet at any vacant channel. Any coordinating transceiver PNC distributes the current phase of the policy sequence to all transceivers belonging to it's wireless local area network WLAN by means of data transfer. A new normal transceiver can join any wireless local area WLAN at work after the first acceleration period. The new normal transceiver extracts the phase of the policy sequence from the data transferred by the coordinating transceiver PNC then starts using the relevant policy sequence with the extracted phase.

The following policy sequence can be used in a preferred embodiment:

S1=[u,u,u,d,d,d];
S2=[u,u,d,d];
S3[u,d];
S4=[u,u,d].

In this case the following policy sequence is used for a new coordinating transceiver PNC:

S5=[d, u, u, u, u] and the following policy sequence is used for a normal transceiver:

S6=[u,d,d,d,d]

The method for data transmission within a wireless local area network WLAN according to the present invention allows the operation of many wireless local area networks WLANs simultaneously in the same local area, wherein the different wireless local area networks WLANs which overlap each other form a cluster. Transceivers within the wireless local area networks Wlans can be either fixed devices or moveable.

The method for data transmission within a wireless local area network according to the present invention allows that the clusters each comprising at least one wireless local area network can merge or split. Transmitting transceivers of different wireless local area networks WLANs within a cluster start their respective data transmissions at shifted times to establish different data transmission channels for the wireless local area networks WLANs. After the data transmission has been started at a shifted time a frequency band is changed with each data transmission interval in a cyclical order according to a predetermined frequency hopping sequence which is identical for all wireless local area networks within the cluster. Collisions between wireless local area networks WLANs using different data transmission channels cannot occur.

One contribution to timing uncertainties originates from the near-far masking effect. The receiver may not be able to detect a synchronization sequence from a far transmitter in the presence of a near synchronization signal transmitter. When the received synchronization signal from the far transmitter is earlier then the received synchronization signal from the distant transmitter, the inability to detect the distant (earlier) signal leads to synchronization error which increases the timing uncertainty. The preferred embodiment provides a way to reduce this near-far masking effect by using a correlator with a short sequence at the synchronization sequence detector (receiver sequence) with the following property. The peak of the cross correlation between the receiving sequence and the transmitted sequence is close to unity.

FIG. 14a, 14b show a diagram for a preferred embodiment of the synchronization sequence according to the present invention. The transmitted 128 length synchronization sequence sampled at 528 MHz (lasting 242.4 nSec) is shown in FIG. 14a as a TX-synchronization sequence. On the reception side a 46 QPSK synchronization sequence is memorized in the detector. This is shown in FIG. 14a as a RX-synchronization sequence. The synchronization sequence on the transmitting side is spectrally flattened and shaped to fit the 507 MHz band. The peak to average ratio PAR of the transmitted 128 length synchronization sequence signal is 5.97 dB The lost due to non-matching the correlation filter is e.g. 0.69 dB (the peak of the cross correlation is 0.69 dB from the unity). This is shown in FIG. 14b.

FIG. 15 shows the shortening of the near-far-masking effect according to the present invention. The cross correlation of the transmitted synchronization sequence with the QPSK synchronization sequence that is stored in the detector has only a 46 length to a 87 nSec non-zero-values preceding the peak. This limits the near-far-effect to 87 nSec lasting error. The close transmitter potentially masks an earlier synchronization signal within 87 nSec only.

The invention claimed is:

1. A method for data transmission within a wireless local area network (WLAN) which is operable simultaneously with other wireless local area networks (WLANs) in the same local area, wherein each wireless local area network (WLAN) comprises at least one transceiver, the method comprising the steps of:
   transmitting a signal using a transmitting transceiver of a wireless local area network (WLAN) that conveys data to a receiving transceiver of the same wireless local area network (WLAN) during data transmission intervals with changing frequency bands;
   changing the frequency band with each data transmission interval in a cyclical order according to a predetermined frequency hopping sequence which is identical for all simultaneously operated wireless local area networks (WLANs);
   providing a predetermined synchronization policy sequence for each data transmission channel and,
   wherein the transmitting transceivers of different wireless local area networks (WLANs) use different time shifts for the frequency hopping cycle with reference to a local time point that each transceiver holds, to establish different data transmission channels for the wireless local area networks (WLANs);
   wherein each wireless local area network (WLAN) comprises a coordinating transceiver for managing the data traffic within the wireless local area network (WLAN);
   wherein the transceivers transmit or receive a predetermined synchronization signal (sync) during a periodic synchronization time window according to a first synchronization policy sequence; and
   further comprising the step of transmitting the synchronizing signal within the synchronization time window at a fixed point with respect to the beginning of the synchronization time window during synchronization transmission transmission intervals with changing frequency bands.

2. The method according to claim 1, further comprising the step of changing a frequency band with each synchronization transmission interval in a predetermined cyclical order according to a synchronization frequency hopping sequence.

3. The method according to claim 2, wherein the order of frequency bands of the synchronization frequency hopping sequence is the same or reversed to the order of frequency bands of the frequency hopping sequence for the data transmission.

4. The method according to claim 1, wherein an autocorrelation function of the synchronization signal within a synchronization transmission interval approximates an impulse function.

5. A method for data transmission within a wireless local area network (WLAN) which is operable simultaneously with other wireless local area networks (WLANs) in the same local area, wherein each wireless local area network (WLAN) comprises at least one transceiver and a Piconet Coordinator (PNC), the method comprising the steps of:
   transmitting a signal using a transmitting transceiver of a wireless local area network (WLAN) that conveys data to a receiving transceiver of the same wireless local area network (WLAN) during data transmission intervals with changing frequency bands;
   changing the frequency band with each data transmission interval in a cyclical order according to a predetermined frequency hopping sequence;
   wherein the transmitting transceivers of different wireless local area networks (WLANs) use different time shifts for the frequency hopping cycle with reference to a local time point, to establish different data transmission channels for the wireless local area networks (WLANs); and,
   wherein a group of transceivers are all synchronized and form a cluster if any two transceivers in the group can be connected via a virtual chain of directly synchronized transceivers;
   wherein the average synchronization period of any transceiver in a cluster will be equal to the period of the fastest transceiver in the cluster,
   wherein any Piconet coordinator increases the synchronization frequency at random times, for a predetermined acceleration period, thus increasing the average synchronization frequency of all transceivers in its cluster, to enable merging of that cluster with other clusters; and
   wherein when a first cluster having a first synchronization frequency and a second cluster having a second synchronization frequency approach each other they merge to form a united cluster when a synchronization frequency of the first or second cluster has been increased for the predetermined acceleration period, so that at least one synchronization time window of the periodic synchronizing time windows of the first and the second clusters overlap each other.

6. A method for data transmission within a wireless local area network (WLAN) which is operable simultaneously with other wireless local area networks (WLANs) in the same local area, wherein each wireless local area network (WLAN) comprises at least one transceiver, the method comprising the steps of:

transmitting a signal using a transmitting transceiver of a wireless local area network (WLAN) that conveys data to a receiving transceiver of the same wireless local area network (WLAN) during data transmission intervals with changing frequency bands;

changing the frequency band with each data transmission interval in a cyclical order according to a predetermined frequency hopping sequence which is identical for all simultaneously operated wireless local area networks (WLANs);

wherein the transmitting transceivers of different wireless local area networks (WLANs) use different time shifts for the frequency hopping cycle with reference to a local time point that each transceiver holds, to establish different data transmission channels for the wireless local area networks (WLANs);

wherein each wireless local area network (WLAN) comprises a coordinating transceiver for managing the data traffic within the wireless local area network, and, wherein the transceivers transmit and receive a predetermined synchronization signal (sync) sequentially in the same periodic time window according to a second synchronization policy sequence.

* * * * *